United States Patent
Karle et al.

(10) Patent No.: US 8,122,342 B2
(45) Date of Patent: Feb. 21, 2012

(54) ENFORCING ACCESSIBLE CONTENT DEVELOPMENT

(75) Inventors: Christopher J. Karle, Wayland, MA (US); Corinne M. Ryan, Westford, MA (US); Richard S. Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 12/058,324

(22) Filed: Mar. 28, 2008

(65) Prior Publication Data

US 2008/0184104 A1 Jul. 31, 2008

Related U.S. Application Data

(63) Continuation of application No. 11/250,024, filed on Oct. 13, 2005, now abandoned.

(51) Int. Cl.
*G06F 17/00* (2006.01)
*G06F 9/44* (2006.01)

(52) U.S. Cl. ........ 715/234; 715/205; 715/255; 715/760; 715/762; 717/106; 717/162; 717/114

(58) Field of Classification Search .............. 715/200, 715/202, 204, 205, 207, 209, 234, 255, 256, 715/273, 713, 760, 762; 717/106, 108, 110, 717/111, 114, 115, 118, 140–143, 162, 163
See application file for complete search history.

(56) References Cited

U.S. PATENT DOCUMENTS

| | | | |
|---|---|---|---|
| 6,948,151 B2 * | 9/2005 | Gerken | 717/108 |
| 7,000,218 B2 | 2/2006 | Gerken | |
| 7,076,766 B2 * | 7/2006 | Wirts et al. | 717/121 |
| 7,089,330 B1 * | 8/2006 | Mason | 709/246 |
| 7,096,455 B2 | 8/2006 | Santiago | |
| 7,219,350 B2 | 5/2007 | Bhogal et al. | |
| 7,246,134 B1 * | 7/2007 | Kitain et al. | 1/1 |
| 7,376,660 B2 | 5/2008 | Backhouse | |
| 2003/0020752 A1 | 1/2003 | Santiago | |
| 2003/0105884 A1 * | 6/2003 | Upton | 709/318 |
| 2004/0003130 A1 * | 1/2004 | Becker et al. | 709/311 |
| 2004/0268312 A1 | 12/2004 | Abe et al. | |
| 2006/0150082 A1 * | 7/2006 | Raiyani et al. | 715/513 |

OTHER PUBLICATIONS http://cita.rehab.uiuc.edu/courses/2002-02-REHAB711NC/Iec16/slide7.html, "Slide 7: Hotmetal Pro Accessibility Checking Example," Feb. 2002, pp. 1-3.
USPTO U.S. Appl. No. 11/250,024.
Al-Darwish, "PageGen: An Effective Scheme for Dynamic Generation of Web Pages", Information and Software Technology, Jul. 15, 2003, vol. 45, Issue 10, pp. 651-662.
Ayers, Danny, et al., "Professional Java Server Programming", Wrox Press Ltd., Dec. 1999, pp. 123-154.
McReynolds, Scott, et al., "Accessing Web DataWindows with Java Server Pages Using Custom Tags", http://www.sybase.com/detail/printthis/1,6907,1011356,00.html, Feb. 2001, pp. 1-16.
Roth, Mark, et al., "JavaServer Pages Specification 2.0", Sun Microsystems, Nov. 24, 2003, pp. 1-173-1-176.

* cited by examiner

*Primary Examiner* — Maikhanh Nguyen
(74) *Attorney, Agent, or Firm* — Stephen R. Tkacs; Stephen J. Walder, Jr; Jill A. Poimboeuf (57) ABSTRACT

A mechanism is provided for enforcing accessible content development. The mechanism enforces accessible content development by accessing a tag library descriptor for each of a plurality of markup tags for web content authoring where the tag library descriptor notes one or more tag sub-elements required for accessibility. The mechanism analyzes each markup tag in a piece of web content by comparing the tag library descriptor accessibility requirements to sub-elements included with each markup tag to determine whether all required accessibility sub-elements are present. The mechanism generates an error message if all required accessibility sub-elements of a markup tag are not present.

14 Claims, 4 Drawing Sheets

300

```
<tag>
   <name>img</name>
   <tagclass>com.ibm.workplace.taglib.ImgTag</tagclass>
   <bodycontent>EMPTY</bodycontent>
```

302
```
<attribute>
   <name>src</name>
   <required>true</required>
   <rtexprvalue>true</rtexprvalue>
</attribute>
```

304
```
<attribute>
   <name>altText</name>
   <required>true</required>
   <rtexprvalue>true</rtexprvalue>
</attribute>
```

```
   <attribute>
      <name>height</name>
      <required>false</required>
      <rtexprvalue>true</rtexprvalue>
   </attribute>
   <attribute>
      <name>width</name>
      <required>false</required>
      <rtexprvalue>true</rtexprvalue>
   </attribute>
   <attribute>
      <name>align</name>
      <required>false</required>
      <rtexprvalue>true</rtexprvalue>
   </attribute>
   <attribute>
      <name>onError</name>
      <required>false</required>
      <rtexprvalue>true</rtexprvalue>
   </attribute>
   <attribute>
      <name>chkBidi</name>
      <required>false</required>
      <rtexprvalue>true</rtexprvalue>
   </attribute>
</tag>
```

ENFORCING ACCESSIBLE CONTENT DEVELOPMENT

CROSS-REFERENCES TO RELATED APPLICATIONS

Pursuant to 35 USC §120, this continuation application claims priority to and benefit of U.S. patent application Ser. No. 11/250,024, entitled "SYSTEMS, METHODS, AND MEDIA FOR ENFORCING ACCESSIBLE CONTENT DEVELOPMENT", filed on Oct. 13, 2005, now abandoned, the disclosure of which is incorporated herein in its entirety for all purposes.

FIELD OF INVENTION

The present invention is in the field of content development, such as web content development, for computer systems and networks. More particularly, the present invention relates to systems, methods and media for enforcing accessible content development.

BACKGROUND

Networks such as the Internet and intranets continue to increase in popularity as vehicles to disseminate information, provide content, encourage collaboration, or otherwise facilitate communication. An integral part of content pages on these networks is the user interface for applications. Many developers create content using web authoring tools that allow developers to create pages of content using the tool, after which the tool generates the appropriate code to use on the network. Other developers write code manually, using markup tags as building blocks of the user interface for the application they are creating. Developers can utilize Hypertext Markup Language (HTML) markup tags, acquire third party tags from JavaServer Page (JSP)™ technology developers, or can develop their own markup tags. Markup tags are tags in an HTML document that instruct Web browser software on how and where to display the text or other content associated with the markup tag, create links between documents, etc. JSP is a standard developed by Sun™ Microsystems, Inc. (of Santa Clara, Calif.) to, for example, assist developers in building dynamic Web sites and accessing database information on a Web server.

As more content becomes available on the Internet (or on intranets), the need to provide accessible content increases. Without accessible code underlying Internet or intranet pages, users with disabilities cannot properly access some of the visual indicators in the standard user interfaces. Accessibility code provides, for example, a description of an image or a table so that users who cannot view the image or table because of a disability are instead provided its description. This allows those users to still access the content of the page (using text readers or other devices) even though they may not be able to see an image, table, or other content. Content developers who desire to make their content available to as wide an audience as possible accordingly desire to have accessible code. Moreover, many customers of web or other content, such as governmental agencies, often prefer or require that developers provide accessible code.

While accessible code provides a significant benefit, the cost of developing, testing, and troubleshooting accessible code can be very high. Most content developers developing accessible code first create the code and then send their code to Quality Engineering (QE) or other groups for verification of the accessibility of code and the user interface. If there are any errors (i.e., some of the code is non-accessible), the code is sent back to the developer to fix the identified bugs. After the code has been fixed, it must then be retested by the QE group. Such a process call be time-consuming and expensive, requiring the expenditure of resources by a QE group and potentially large delays in testing and fixing the code. These problems are exacerbated when using third party tag sets to generate the code, as most of the tag sets have not been configured to provide accessible code. Proper accessibility use of these tag sets is generally not enforced as many customers of these tag sets do not require accessible code.

One solution to this problem is to utilize the accessibility checking feature of WebKing® by Parasoft® Corporation of Monrovia, Calif. Using WebKing®, a developer may check completed code for accessibility problems at runt-time after they have properly configured the tool. The developer manually selects each page to be analyzed, allowing the program to perform a run-time check of the completed code and to produce an error report that identifies accessibility issues. This solution, however, still results in significant delays in producing accessible code as the developer must run the program at the end of a code cycle and then go back to fix any errors. The time required for QE groups is reduced, but developers must instead test the code for accessibility themselves and then redirect their development resources to fixing any problems. Another problem with the solution is that WebKing® cannot process content created with JavaScript®, making the use of JavaScript generated accessibility information more difficult. There is a need, therefore, for an effective mechanism to ensure the accessibility of developed content.

SUMMARY

The problems identified above are in large part addressed by systems, methods and media for enforcing accessible content development. One embodiment provides a method for enforcing accessible content development comprising accessing a tag library descriptor for each of a plurality of markup tags for web content authoring where the tag library descriptor notes one or more tag sub-elements required for accessibility. The method may further include analyzing each markup tag in a piece of web content by comparing the tag library descriptor accessibility requirements to sub-elements included with each markup tag to determine whether all required accessibility sub-elements are present. The method may further include generating an error message if all required accessibility sub-elements of a markup tag are not present. The one or more tag sub-elements associated with accessibility may include alternate text for one or more of an image, table, label or graph.

Another embodiment provides a machine-accessible medium containing instructions effective, when executing in a data processing system, to cause the system to perform a series of operations for determining the location of a stylus for a portable electronic device. The series of operations generally includes accessing a tag library descriptor for each of a plurality of markup tags for web content authoring where the tag library descriptor notes one or more tag sub-elements required for accessibility. The series of operations may further include analyzing each markup tag in a piece of web content by comparing the tag library descriptor accessibility requirements to sub-elements included with each markup tag to determine whether all required accessibility sub-elements are present. The series of operations may further include generating an error message if all required accessibility sub-elements of a markup tag are not present. The one or more tag sub-elements associated with accessibility may include alternate text for one or more of an image, table, label or graph.

Another embodiment provides a content authoring system. The system may generally include a markup tag library comprising a plurality of markup tags each associated with a tag library descriptor, where the tag library descriptor notes all markup tag sub-elements required for accessibility. The system may also generally include a web authoring tool in communication with the markup tag library to compile code for a piece of web content based on the tag library descriptor and the markup tags, where the web authoring tools is adapted to generate an error message if all required sub-elements are not present.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods and media for enforcing accessible content development are disclosed. One embodiment provides a method for enforcing accessible content development comprising accessing a tag library descriptor for each of a plurality of markup tags for web content authoring where the tag library descriptor notes one or more tag sub-elements required for accessibility. The method may further include analyzing each markup tag in a piece of web content by comparing the tag library descriptor accessibility requirements to sub-elements included with each markup tag to determine whether all required accessibility sub-elements are present. The method may further include generating an error message if all required accessibility sub-elements of a markup tag are not present. The one or more tag sub-elements associated with accessibility may include alternate text for one or more of an image, table, label or graph.

Using the disclosed system and methodologies, the use of accessible code in web content development may be automatically enforced during the development stage. By requiring accessibility-related sub-elements in a tag library descriptor file, a developer may be prevented from compiling code using markup tags that do not meet accessibility standards. The developer may then modify her code to add the accessibility features, potentially preventing wasteful and time-consuming testing and debugging between test groups and developers.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Those skilled in the relevant art will recognize that portions of the invention may reside on a server computer system while corresponding portions may reside oil a client computer system. Data structures and transmission of data (including wireless transmission) particular to aspects of the invention are also encompassed within the scope of the invention.

Figure 1:
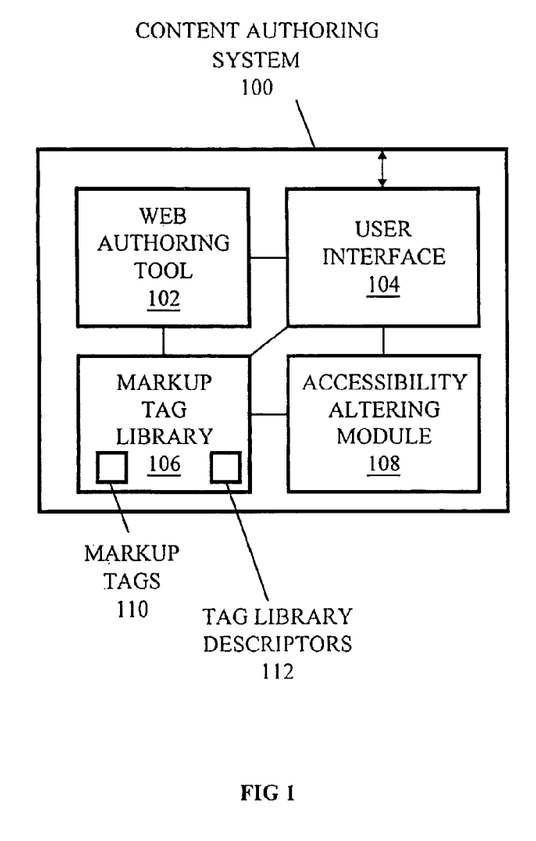
FIG. 1 depicts a block diagram of a content authoring system with an accessibility altering module according to one embodiment.

Turning now to the drawings, FIG. 1 depicts a block diagram of a content authoring system with an accessibility altering module according to one embodiment. The content authoring system 100 of FIG. 1 includes a web authoring tool 102, a user interface 104, a markup tag library 106, and an accessibility altering module 108. The markup tag library 106 may include a plurality of markup tags 110 and associated tag library descriptor (TLD) 112 files. Using the content authoring system 100 of the disclosed embodiments, a developer may generate accessible web content based on markup tag libraries. The disclosed system may advantageously automatically enforce accessibility in generated web content code by modification of tag, library descriptor files to require accessibility sub-elements to be present in markup tags 110 being used for web content development. Web content may be any document or page adapted to be used on the Internet or an intranet utilizing HTML or other languages or protocols.

The content authoring system 100, and any or all of its components, may execute on a general or special purpose computer system such as one or more of a personal computer, workstation, server, mainframe computer, notebook or laptop computer, tablet PC, desktop computer, portable computer system, PDA, set-top box, mobile phone, wireless device, or the like. The computer system may, in one embodiment, include a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive" or "hard disk drive"), a pointing device such as a mouse, and an optional network interface adapter, all electrically connected using a motherboard or system planar to electrically connect these components together. In one embodiment, the content authoring system 100 may be implemented on an International Business Machine Corporation (IBM®) eServer or similar server having one or more processors, or threads of processors, executing software. The content authoring system 100 (and its components) may optionally be in communication with other computer systems via a network or other data communications channels, such as the Internet, an intranet, a LAN, a WAN, an Ethernet network, wireless network, etc.

Figure 2:
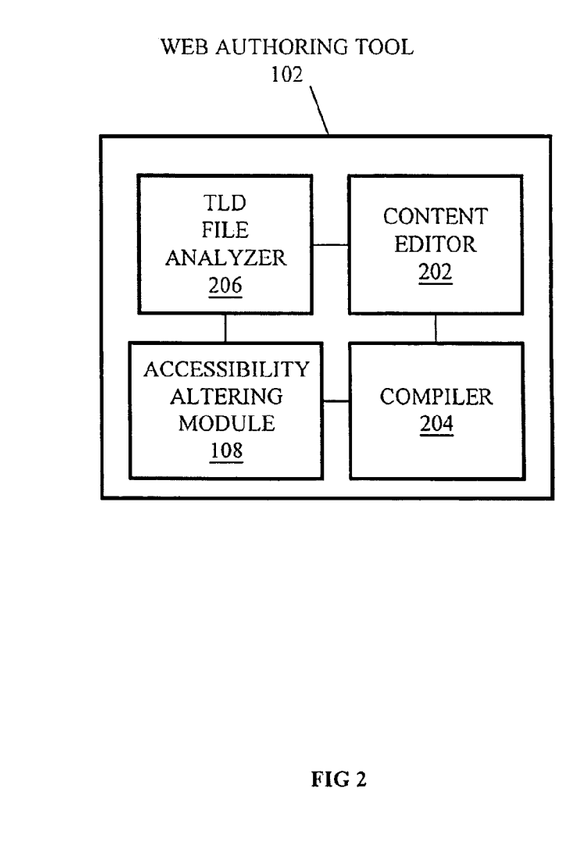
FIG. 2 depicts a block diagram of the web authoring tool of the content authoring system of FIG. 1 according to one embodiment.

The web authoring tool 102 may facilitate the creation of web content by a user and is described in more detail in relation to FIG. 2. The web authoring tool 102 may access the markup tags 110 and TLD files 112 of the markup tag library 106 in generating the web content code for user interfaces. The markup tags 110 (such as JSP tags) that are available to a developer using the web authoring tool 102 may be defined in a TLD file 112, which also may define the tag inputs and their sub-elements or attributes. The markup tag library 106 may include one or more tag libraries, each of which may include a TLD file 112 associated with one or more markup tags 110. The TLD file 112 may typically be an eXtensible Markup Language (XML) document describing a tag library and may contain information about the library as a whole as well as each tag contained in the library. Typically, a TLD file 112 will only require minimum required inputs for each markup tag 110 so that the TLD file 112 will cater to a larger audience. In the case of an image tag, for example, the TLD 112 may require the source location and file name of the image file, but other attributes such as height or width may be optional. When a developer uses the image tag of this example but omits the file name of the image, a compile error may result. In an alternative embodiment, a developer may access the markup tag library 106 manually without use of a web authoring tool 102. In the disclosed system, however, the TLD file 112 may have sub-elements associated with accessibility also be required so that attempting to compile the code without providing accessibility information results in an error.

The user interface 104 may facilitate receiving input to the content authoring system 100 from a user as well as providing output from the content authoring system 100 to a user. The user interface 104 may include input devices such as keyboards, mouse, voice input, etc. and may also include output devices such as a display, speaker, printer, etc. The user interface 104 may also utilize a graphical user interface (GUI) or other software to input and/or output to and from the user.

The accessibility altering module 108 of some embodiments may modify TLD files 112 to enforce accessibility of the result code. In one embodiment, the accessibility altering module 108 may access a TLD file 112, modify the TLD file 112 by requiring accessibility sub-elements for different tags, and then saving or storing the modified TLD file 112. The accessibility altering module 108 may modify the TLD file 112 by switching or flipping definitions in the TLD file 112 to require attributes or sub-elements on tags that would make the resulting application accessible. The accessibility altering module 108 may execute upon user request, automatically on all tag libraries or new tag libraries, or by other methodology. In other embodiments, a user may manually modify the TLD files 112 or the TLD files 112 may already be configured to enforce accessibility, making the accessibility altering module 108 unnecessary.

As has been described, the modifications to a TLD file 112 requiring accessibility sub-elements may be accomplished in different fashions at different times. A content authoring system 100 may receive modified TLD files 112 from another source, such as third party tag libraries that are accessibility-friendly or from an organization development database where TLD files 112 have been modified and stored for use by an organization. A content authorizing system 100 may also modify TLD files 112 itself, such as by use of the accessibility altering module 108 or manual edits by a developer.

FIG. 2 depicts a block diagram of the web authoring tool of the content authoring system of FIG. 1 according to one embodiment. The web authoring tool 102 of FIG. 2 includes a content editor 202, a compiler 204, a TLD file analyzer 206, and an accessibility altering module 108. A user may use content editor 202 to edit and prepare web content by inputting information, selecting tag libraries, choosing versions, etc. The compiler 204 may, such as upon request of the user, analyze the prepared content resulting from the content editor and generate, or compile, executable code. The compiler 204 checks for any required sub-elements (which may include JSP attributes) and, in the event a required feature is missing, the compiler 204 generates a compile error. A compile error may prevent the creation of executable or usable code, necessitating the developer to fix the problem or problems that caused the compile error. In the disclosed system, the compiler 204 may advantageously generate a compile error when a developer leaves out an accessibility-required feature (e.g., alternative text, for an image) as defined in the TLD file 112. When faced with such an error, the developer may then add the accessibility-required feature and then recompile. The disclosed system may thus force a developer to make their code accessible by preventing the developer from compiling non-accessible code. This may save overall time and resources as testing for accessible code and correction of the code in response to bugs found in testing may both be eliminated. Making changes by adding features at the time of development may often take less time than making changes after bugs are reported, as errors must be interpreted, versions or software may change, the developer may have to refamiliarize themselves with the project again, etc.

The web authoring tool 102 may also include a TLD file analyzer 206 in some embodiments. The TLD file analyzer 206 may access and analyze a TLD file 112 and/or markup tags 110 to determine whether all accessibility sub-elements or attributes are found. If all sub-elements are not found, the TLD file analyzer 206 may prompt the developer for the required accessibility sub-elements and then save the developer's response. The TLD file analyzer 206 may thus allow developers to respond to prompts instead of having to manually review code, potentially saving significant amounts of time. This may be particularly useful for JSP tags which generate content using JavaScript™ as the JavaScript™ may produce accessible code if the required accessibility attributes are supplied. Examples of this may include content generated resulting from an onLoad event or a mouseover which renders content using style sheets.

The web authoring tool 102 may also include an accessibility altering module 108 in some embodiments, which may be in addition to or instead of the accessibility altering module 108 of the content authoring system 100. As described previously, the accessibility altering module 108 may modify a TLD file 112 so that accessibility sub-elements are required for compilation. An accessibility altering module 108 as part of a web authoring tool 102 may either automatically or upon user request modify TLD files 112 for accessibility purposes.

Figure 3:
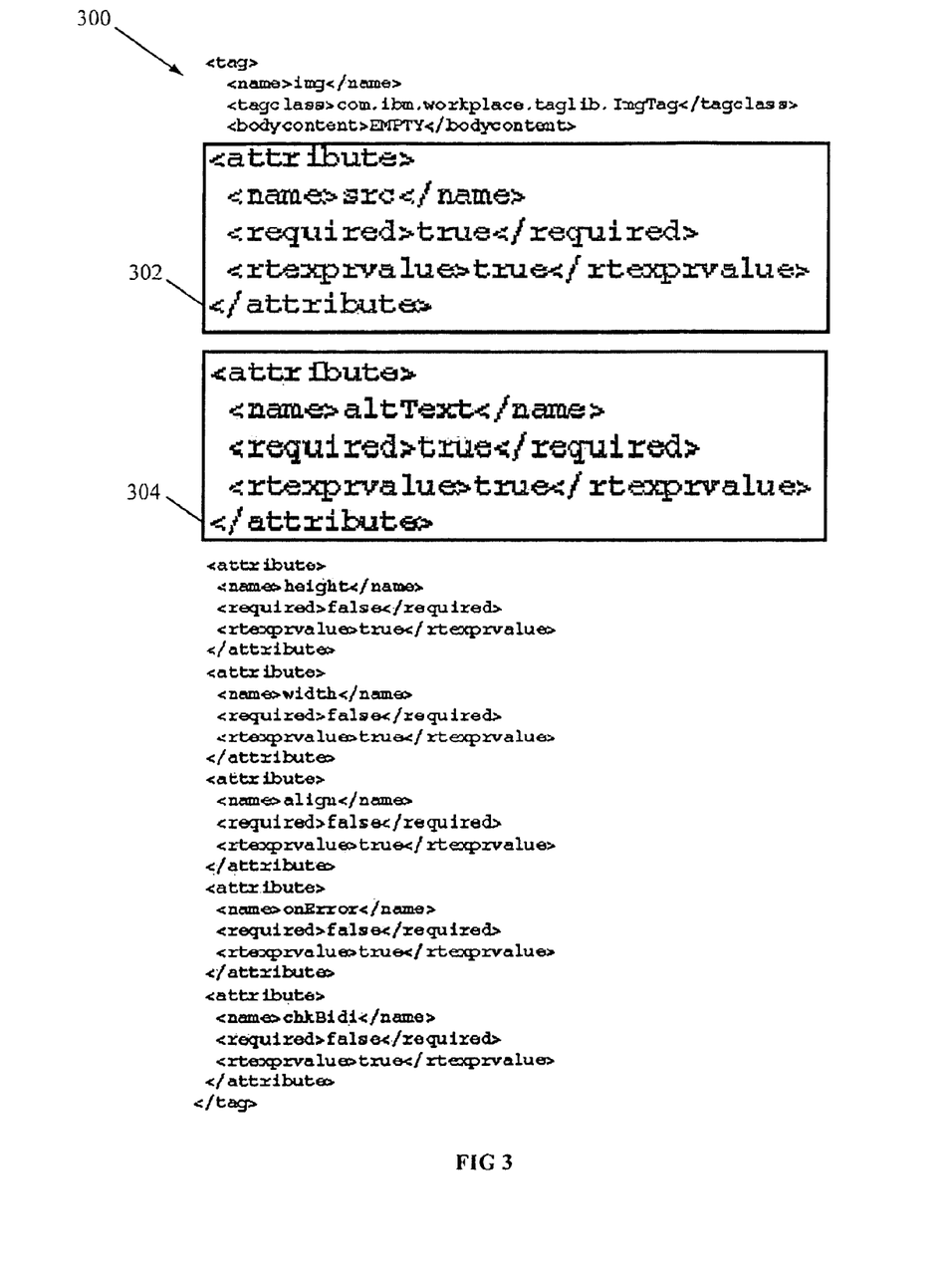
FIG. 3 depicts an example of a snippet of code from a TLD file of the content authoring system of FIG. 1 according to one embodiment.

FIG. 3 depicts an example of a snippet of code from a TLD file of the content authoring system of FIG. 1 according to one embodiment. The snippet of code 300 may represent a sample image tag from a TLD file 112 where an accessibility sub-element or attribute is being forced. Snippet 300 includes a source file attribute 302 entitled 'src', which is the attribute used for the file name of the image. The code '<required>true</required>' defines the file name as required, so that code using snippet 300 will not compile without an identified file name. If a developer uses the image tag of snippet 300 without defining a value for 'src' then a compile error will display in the user interface when the developer goes to view her work. In an alternative embodiment, the snippet 300 may use 'yes' or other nomenclature instead of 'true' to represent an affirmative to the whether the attribute is required. In one embodiment, an example of a proper use of the image tag of FIG. 3 may include:

<WidgetLibrary:img src="images/check.jpg"/> to identify a source and name for the image file when using the 'img' (i.e., image) tag. Attributes may be considered to be a type of sub-element of a tag and may be used interchangeable throughout this document.

Snippet 300 may also include an alternative text sub-element or attribute 304 entitled 'altText', which provides alternative text for accessibility purposes in the event the image cannot be displayed. As for the source file attribute 302, the '<required>true</required>' defines the alternative text as required, so that code using snippet 300 will not compile without alternative text specified for an image. If a developer uses the image tag of snippet 300 without defining a value for 'altText' then a compile error will display in the user interface when the developer goes to view her work. Accordingly, after the disclosed system switches the alternative text required to 'true' from 'false' or 'no', a developer will be notified by a compiler error that the tag was not used to produce accessible code. While an image tag with alternative text is disclosed, other accessibility attributes may also be used. For example, the disclosed system may provide for requiring table summaries to be included for any tables in order to compile code. As only screen readers are likely to use the table summary, as it typically has no presence in a visual user interface, setting the table summary attribute to 'true' may remind the developer that they need to include that feature for accessibility. Other accessibility sub-elements attributes may include alternative text for labels or graphs.

Figure 4:
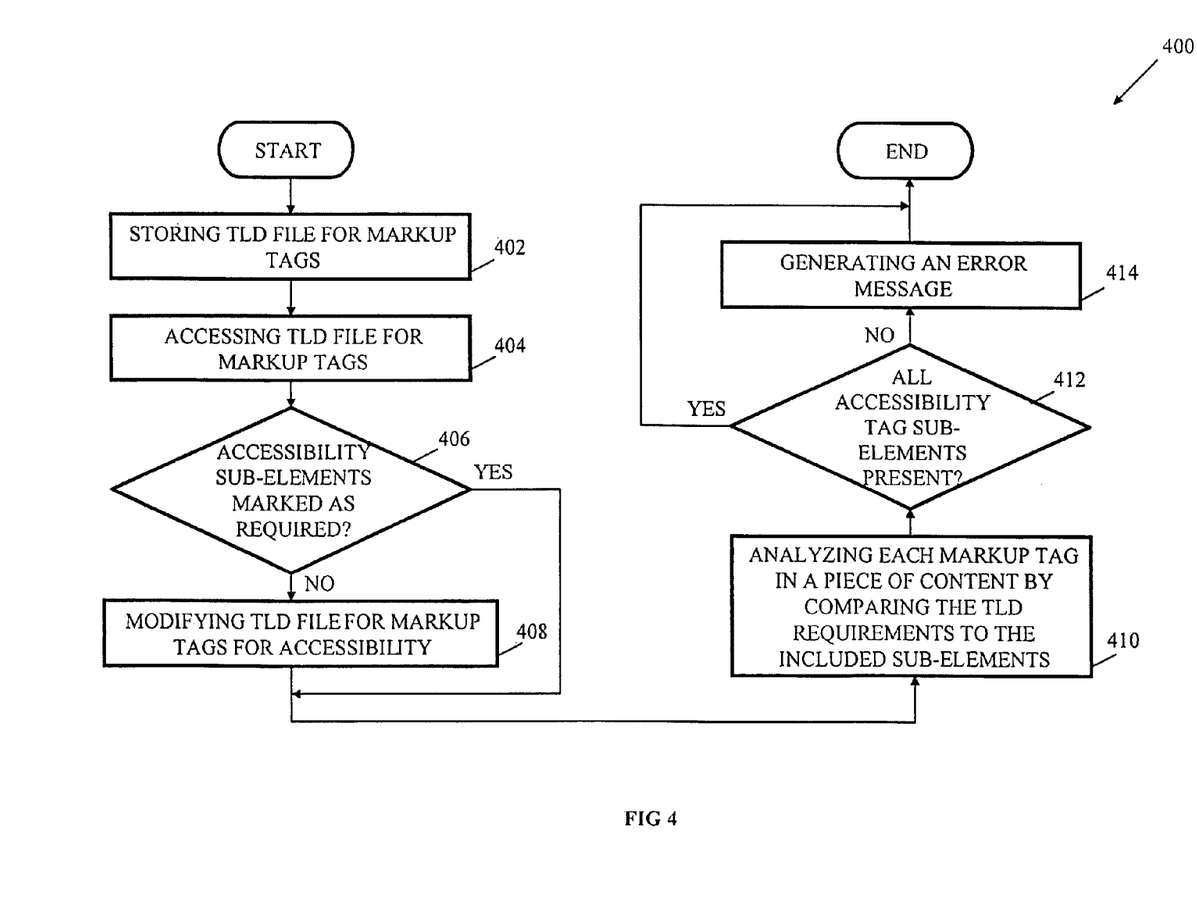
FIG. 4 depicts an example of a flow chart for enforcing accessibility requirements with a tag library descriptor file according to one embodiment.

FIG. 4 depicts an example of a flow chart for enforcing accessibility requirements with a tag library descriptor file according to one embodiment. The content authoring system 100 or any of its components, alone or in combination, may perform the method of flow chart 400. Flow chart 400 begins with optional element 402, storing a TLD file 112 for a group of markup tags 110. At element 402, the content authoring system 100 may store a TLD file 112 that it received (such as part of a third party tag library) or that it modified (such as when a accessibility altering module 108 modified the TLD file 112 to enforce accessibility). Alternatively, element 402 is not required and a TLD file 112 already stored on the content authoring system 100 may be used. The method of flow chart 400 may then continue to element 404, accessing a TLD file 112 associated with one or more markup tags 110. The content authoring system 100 may access a TLD file 112 stored at element 402 or previously stored. In one embodiment, the TLD file 112 may be stored remotely, such as over the Internet or other network connection.

In some optional embodiments, the method of flow chart 400 may modify the TLD file 112 to help enforce accessibility of the resulting code. At decision block 406 of this optional embodiment, the accessibility altering module 108 may determine if all accessibility sub-elements (e.g., alternative text for an image, summary text for a table, etc.) are marked as required in the TLD file 112. If all accessibility sub-elements are marked as required, flow chart 400 continues to element 410. If not all accessibility sub-elements are marked as required, flow chart 400 continues to element 408, where the accessibility altering module 108 may modify the TLD file 112 for accessibility by switching the required value for accessibility sub-elements in the TLD file 112 to 'true'.

The web authoring tool 102 (and/or its compiler 204) may next, at element 410, analyze each markup tag 110 in a piece of content by comparing the TLD file 112 requirements to the included sub-elements. If each markup tag 110 has all of the required sub-elements at decision block 412, the web authoring tool 102 and/or compiler 204 may successfully compile code based on the markup tags 110, after which the flow chart terminates. If any markup tag 110 does not have all of the required accessibility sub-elements (or alternatively any of the required sub-elements), the web authoring tool 102 and/or compiler 204 may then generate an error message at element 414, after which flow chart 400 terminates. Accordingly, only markup tags in a piece of content that meet accessibility requirements will be compiled and turned into working code. If accessibility features are missing, a developer may correct those deficiencies in response to the error message generated at element 414.

Figure 5:
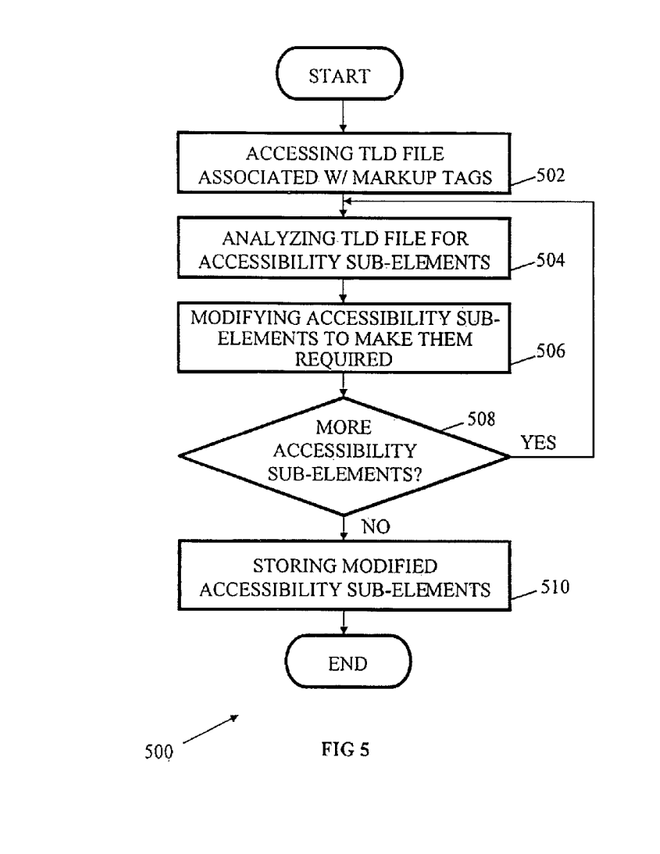
FIG. 5 depicts an example of a flow chart for modifying a tag library descriptor file to enforce accessibility requirements according to one embodiment.

FIG. 5 depicts an example of a flow chart for modifying a tag library descriptor file to enforce accessibility requirements according to one embodiment. The content authoring system 100 or any of its components, alone or in combination, may perform the method of flow chart 500. The content authoring system 100 or its components may perform elements of flow chart 500 at any time, including when TLD files 112 are received as part of a tag library, upon a developer or other user request, or at another time. Flow chart 500 may also represent an example embodiment of the optional modification at elements 406 and 408 of FIG. 4. Flow chart 500 begins with element 502, accessing a TLD file 112 associated with one or more markup tags 110. The content authoring system 100 may access a TLD file 112 stored at element 402 or previously stored. In one embodiment, the TLD file 112 may be accessed remotely, such as over the Internet or other network connection.

The accessibility altering module 108 may modify next analyze the TLD file 112 for any accessibility sub-elements at element 504 to determine if any of the accessibility sub-elements are configured as not required. At element 506, the accessibility altering module 108 may modify any accessibility sub-elements determined to be configured as not required by making those sub-elements required. At decision block 508, the accessibility altering module 108 may determine if more accessibility sub-elements are still configured as 'not required' and may return to element 504 to continue analysis and/or modification. After all accessibility sub-elements are marked as required in the TLD file 112, the accessibility altering module 108 may store the modified TLD file 112 at element 510, after which the flow chart terminates.

By modifying the TLD file 112 to require accessibility sub-elements, the disclosed methodology provides an effective mechanism for enforcing accessibility requirements during web content authoring. The accessibility altering module 108 may perform its modifications at any time, such as when a TLD file 112 is received, first used, upon request, etc. The accessibility altering module 108 may also perform flow chart 500 before the TLD file 112 is passed to developers, such as by the tag library authors or a centralized web content development machine.

Figure 6:
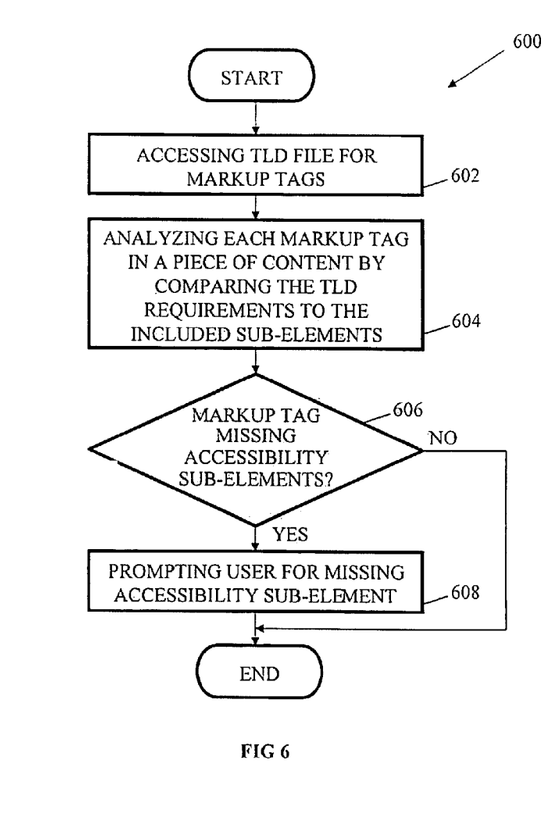
FIG. 6 depicts an example of a flow chart for enforcing accessibility requirements with a tag library descriptor file according to an alternative embodiment.

FIG. 6 depicts an example of a flow chart for enforcing accessibility requirements with a tag library descriptor file according to an alternative embodiment. The content authoring system 100 or any of its components, alone or in combination, may perform the method of flow chart 600. The method of flow chart 600 is an alternative embodiment to the method of flow chart 400. Flow chart 600 begins with element 602, where a web authoring tool 102 (and/or its compiler 204), accesses a TLD file 112 associated with one or more markup tags 110. The web authoring tool 102 and/or its compiler 204 may next, at element 604, analyze each markup tag 110 in a piece of content by comparing the TLD file 112 requirements to the included sub-elements. If each markup tag 110 has all of the required sub-elements at decision block 606, the flow chart terminates and the web authoring tool 102 and/or compiler 204 may successfully compile code based on the markup tags 110. If any markup tag 110 does not have all of the required accessibility sub-elements (or alternatively any of the required sub-elements), the TLD file analyzer 206 may then prompt a user for the missing accessibility sub-elements at element 608, after which the flow chart terminates. The method of flow chart 600 allows a developer to interactively connect accessibility deficiencies, substantially reducing the need for future testing or corrections. The disclosed method prompts the user for input instead of generating an error message as in element 414 of FIG. 4.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for enforcing accessible content development. It is understood that the form of the invention shown and described in the detailed description and the drawings are to be taken merely as examples. It is intended that the following claims be interpreted broadly to embrace all the variations of the example embodiments disclosed.

What is claimed is:

1. A method, in a content authoring data processing system, for enforcing accessible content development, the method comprising:
   accessing, by an accessibility altering module in the content authoring data processing system, a tag library descriptor for each of a plurality of markup tags for web content authoring from a markup tag library in the content authoring data processing system;
   determining, by the accessibility altering module, whether the tag library descriptor for each of the plurality of markup tags has one or more required accessibility sub-elements that are required for accessibility;
   responsive to the accessibility altering module determining that a given tag library descriptor for a given markup tag has one or more required accessibility sub-elements, marking, by the accessibility altering module, the tag library descriptor to identify the one or more required accessibility sub-elements as being required to form a modified tag library descriptor;
   responsive to a user authoring a portion of web content in a web authoring tool in the content authoring data processing system, analyzing, by a tag library descriptor file analyzer in the web authoring tool, each markup tag in the portion of web content by comparing the tag library descriptor accessibility requirements to sub-elements included with each markup tag to determine whether all required accessibility sub-elements are present; and
   generating, by a user interface in the content authoring data processing system, an error message responsive to a determination that all required accessibility sub-elements of a markup tag are not present.

2. The method of claim 1, further comprising storing the modified tag library descriptor in the markup tag library.

3. The method of claim 1, further comprising prompting the user for a value for a required accessibility sub-element in the portion of web content responsive to a determination that all required accessibility sub-elements of a markup tag are not present.

4. The method of claim 1, wherein the one or more required accessibility sub-elements comprise alternate text for an image, table, label or graph.

5. A non-transitory machine-accessible medium containing instructions effective, when executing in a content authoring data processing system, to cause the content authoring data processing system to perform operations comprising:
   accessing, by an accessibility altering module in the content authoring data processing system, a tag library descriptor for each of a plurality of markup tags for web content authoring from a markup tag library in the content authoring data processing system;
   determining, by the accessibility altering module, whether the tag library descriptor for each of the plurality of markup tags has one or more required accessibility sub-elements that are required for accessibility;
   responsive to the accessibility altering module determining that a given tag library descriptor for a given markup tag has one or more required accessibility sub-elements, marking, by the accessibility altering module, the tag library descriptor to identify the one or more required accessibility sub-elements as being required to form a modified tag library descriptor;
   responsive to a user authoring a portion of web content in a web authoring tool in the content authoring data processing system, analyzing, by a tag library descriptor file analyzer in the web authoring tool, each markup tag in the portion of web content by comparing the tag library descriptor accessibility requirements to sub-elements included with each markup tag to determine whether all required accessibility sub-elements are present; and
   generating, by a user interface in the content authoring data processing system, an error message responsive to a determination that all required accessibility sub-elements of a markup tag are not present.

6. The machine-accessible medium of claim 5, the operations further comprising storing the modified tag library descriptor in the markup tag library.

7. The machine-accessible medium of claim 5, the operations further comprising prompting the user for a value for a required accessibility sub-element in the portion of web content responsive to a determination that all required accessibility sub-elements of a markup tag are not present.

8. The machine-accessible medium of claim 5, wherein the one or more required accessibility sub-elements comprise alternate text for one or more of an image, table, label or graph.

9. A content authoring data processing system, the content authoring data processing system comprising:
   a processing unit; and
   a memory coupled to the processing unit, wherein the memory stores instructions, which when executed by the processing unit, cause the processing unit to perform operations comprising:

accessing, by an accessibility altering module, a markup tag library comprising a plurality of markup tags each associated with a tag library descriptor;

determining, by the accessibility altering module, whether the tag library descriptor for each of the plurality of markup tags has one or more required accessibility sub-elements that are required for accessibility;

responsive to the accessibility altering module determining that a given tag library descriptor for a given markup tag has one or more required accessibility sub-elements, marking, by the accessibility altering module, the tag library descriptor to identify the one or more required accessibility sub-elements as being required to form a modified tag library descriptor; and responsive to a user authoring a portion of web content in a web authoring tool in communication with the markup tag library, analyzing, by a tag library descriptor file analyzer in the web authoring tool, each markup tag in the portion of web content by comparing the tag library descriptor accessibility requirements to sub-elements included with each markup tag to determine whether all required accessibility sub-elements are present; and generating an error message responsive to a determination that all required accessibility sub-elements of a markup tag are not present.

10. The content authoring data processing system of claim 9, further comprising a user interface to receive input from a user and to provide output to the user.

11. The content authoring data processing system of claim 9, wherein the one or more required accessibility sub-elements comprise alternate text for an image, table, label or graph.

12. The content authoring data processing system of claim 9, wherein the web authoring tool comprises a compiler to compile generated code based on the tag library descriptor and the markup tags.

13. The content authoring data processing system of claim 9, the operations further comprising prompting the user for information associated with a required accessibility sub-element in the portion of web content responsive to a determination that all required accessibility sub-elements of a markup tag are not present.

14. The content authoring data processing system of claim 9, wherein the web authoring tool and the markup tag library are in communication via a network.

* * * * *